US006221453B1

(12) United States Patent
Majumdar

(10) Patent No.: US 6,221,453 B1
(45) Date of Patent: Apr. 24, 2001

(54) HARMONIC LABEL FOR MARKING OF TIRES

(75) Inventor: Ramendra Nath Majumdar, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/260,886

(22) Filed: Mar. 2, 1999

(51) Int. Cl.$^7$ .............................. B60C 13/00; G09F 3/00
(52) U.S. Cl. ...................... 428/40.2; 152/450; 152/524; 152/525; 428/40.1; 428/41.6; 428/41.7; 428/42.1; 428/913
(58) Field of Search ................. 428/40.1, 40.2, 428/41.6, 41.7, 42.1, 913; 152/524, 450, 525

(56) References Cited

U.S. PATENT DOCUMENTS

| | | | |
|---|---|---|---|
| 3,607,498 | 9/1971 | Kubota | 156/116 |
| 4,060,168 | 11/1977 | Romagnoli | 206/216 |
| 4,584,219 | 4/1986 | Baartmans | 428/42 |
| 4,911,218 | 3/1990 | Patitsas | 152/525 |
| 5,058,648 | 10/1991 | Kansupada | 152/524 |
| 5,149,591 | 9/1992 | Patitsas et al. | 428/423.1 |
| 5,547,499 | 8/1996 | Kawasumi et al. | 106/20 R |
| 5,697,166 | * 12/1997 | Hommel | 33/758 |
| 5,840,138 | 11/1998 | Majumdar et al. | |

FOREIGN PATENT DOCUMENTS

| | | |
|---|---|---|
| 750967 | 1/1967 | (CA) . |
| 0 587 282 A1 | 3/1994 | (EP) . |
| 8-328474 | * 12/1996 | (JP) . |
| WO 95/19266 | 7/1995 | (WO) . |

OTHER PUBLICATIONS

Article re "harmonics," p. 51 Academic American Encylopedia, Arete Publishing Company, Inc., Princeton, NJ., Jan. 1, 1981.

Article re "fluorescence," pp. 186–187, Academic American Encyclopedia, Arete Publishing Company, Inc., Princeton, NJ., Jan. 1, 1981.

Article re "Brighteners, fluorescent," in Kirk–Othmer Encyclopedia of Chemical Technology. Third Edition, vol. 4, pp. 213–226, John Wiley & Sons, New York, Jan. 1, 1978.

An article entitled "Mechanics of Pneumatic Tires," Editor, Samuel K. Clark, University of Michigan, Ann Arbor, MI 48109, U.S. Department of Transportation National Highway Traffic Safety Administration, Washington, D.C. 20590, p. 633, Aug. 1981.

An article Entitled "Correcting Vehicle Shake," by A. H. Neill, Jr., and Akira Kondo, Tire Science and Technology, TSTCA, vol. 2, No. 3, Aug., 1974, pp. 179–194.

* cited by examiner

Primary Examiner—Nasser Ahmad
(74) Attorney, Agent, or Firm—Henry C Young, Jr

(57) ABSTRACT

A fluorescent label can be used to identify the location of variations, e.g. radial variations, in a pneumatic tire so the tire can be precisely mixed and matched with other components such as tire rims which may have compensating variations. The fluorescent label desirably includes a release backing, a pressure sensitive adhesive to bind said label to a tire, a nontransparent face sheet that reflects a substantial portion of incident light back towards its source, transparent top layer which contains one or more fluorescent dye(s) disproportionately present in the surface portion of the layer and preferably in the layer nearest the adhesive side. The location of the largest portion of the fluorescent dye is important as commercial labels with the dye on the exterior surface suffer from fluorescent reading losses apparently due to migration of mobile molecules from other tires stored in contact with the label's exterior surface.

12 Claims, No Drawings

HARMONIC LABEL FOR MARKING OF TIRES

FIELD OF INVENTION

This invention relates to fluorescent labels and a process for using said label to mark variations on pneumatic tires. The labels retain fluorescence activity longer than other labels used in this particular application due to the isolation of the fluorescent material from migrating components from other tires. The labels identify otherwise invisible or hard to detect variations in the tire that can be compensated for by match mounting the tire and its rim to minimize slight but detectable variations in the tire and rim

BACKGROUND OF THE INVENTION

The presence of chemicals within tires, which are capable of migrating, is well known. New tire sidewalls are often coated by the manufacturer with water removable protective paints or coatings, particularly when the tire sidewalls include a non-black component (e.g. a white sidewall) which can be detrimentally stained if the non-black component (whitewall) contacts the typical black colored remainder of another tire for an extended time during shipping or storage of new tires.

Pneumatic tires are generally assembled from a multitude of plies, layers, cords, etc. The components are carefully assembled and adhered to each other on a tire assembly machine. The green tire after removal from the tire assembly machine is vulcanized in a tire curing press. The cured tire from the tire curing press is evaluated for dimensional variations, weight variations, variations from inflating the tire, and variations detectable as the tire is rotated. Tire manufacturers measure and mark these detectable variations as part of their quality control programs. The tire manufacturers use the data from these evaluations to perform in process adjustments to their equipment and process to minimize total variations in subsequent production.

Automobile manufacturers recognized that the tire manufacturer's marking of the location and extent of minor variations between tires could be used to compensatingly match the variations in the tire with variations in other automobile components such as the tire rim. They requested the markings be left on the tires to be shipped to them. Automobile manufacturers requested the markings be made fluorescent because such markings could be mechanically read by machines capable of detecting fluorescent labels or markings and this would facilitate match mounting by machines, such as those machines installing tires on rims.

Most fluorescent labels for this application comprise a release backing, a pressure sensitive adhesive to hold the label on a substrate, an inexpensive face sheet, the top of which is coated with a fluorescent ink. Many of the fluorescent inks are solvent based systems that either require expensive solvent recovery or incineration systems or release solvent into the environment. Automobile manufacturers have experienced problems of poor adhesion of labels to tires and labels which lose their fluorescence during storage on the tires. Generally but not always, the fluorescent labels or markings are removed after match mounting and prior to delivery of the finished automobile to the user.

The term harmonics relates to a variety of sinusoidal components that make up a musical tone. If the first frequency of a tone is 440 Hz then the second will generally be at 880 Hz and the third at 1320 Hz. A measurement of a pneumatic tire as it rotates one revolution can often be a sinusoid. If the measurement produces one minimum value and one maximum value per rotation it will have sinusoidal characteristics with a frequency of 1. Thus, a marking of the first harmonic of a rotating tire usually indicates a minimum or maximum measured value on a sector of a tire for a particular test. A preferred first harmonic test marking is the diameter of the tire.

It would be desirable to have a fluorescent label that retained its initial fluorescent value for many months even while in contact with a black tire sidewall. It would be desirable to manufacture these labels while minimizing the release of harmful organic solvents into the environment.

SUMMARY OF THE INVENTION

A process for marking at least one sector of a pneumatic tire with a fluorescent label is described. The process involves detecting a radial variation in at least one sector of the tire, applying a fluorescent label to identify the location of the variation or to identify some other position a known distance from that variation. The invention will be described with regard to a radial variation (i.e. offset tread portion) although it is to be understood it can also be applied to other variations such as weight variations and the like. When mounting the tire on a rim the fluorescent label can be detected, a marked tire rim can be selected, and then the tire is rotated with respect to a tire rim to minimize total deviation of the tire and rim when the tire is mounted on the rim.

The fluorescent label desirably comprises a release liner, a pressure sensitive adhesive to bind said label to said tire, a nontransparent face sheet that reflects incident light back towards its source, and a transparent top layer containing one or more fluorescent dyes that are disproportionately located in the portion of the transparent top layer nearest a surface of the layer. Desirably, the surface with the dye in the one nearest the adhesive. The transparent top layer itself inherently provides a barrier to components in adjacent black tire sidewalls that seem to deactivate the fluorescence in conventional fluorescent labels when the exterior of the labels are stored against black tire sidewalls. Desirably the transparent top layer provides a barrier to components in the marked tire, which might deactivate the fluorescent dyes in the transparent top layer from the interior or adhesive side of the label. A dyeing procedure to prepare such transparent top layer with the dye disproportionately near one surface is disclosed in EP 0 587 282 A1 and WO 95/19266 hereby incorporated by reference. The barrier effect of transparent top layer prepared by these dyeing techniques maintains the fluorescent activity of the fluorescent dye for days, weeks, and desirably for months.

DETAILED DESCRIPTION OF THE INVENTION

In accordance with this invention, a process for applying a specific fluorescent label is described wherein the label includes a fluorescent dye or dyes disproportionately located in the upper or lower surface of the transparent top layer and desirably such that the dyes are closest to the adhesive side. The transparent top layer itself provides a barrier to components in adjacent black tire sidewalls that seem to deactivate the fluorescence in conventional fluorescent labels when the exterior of the labels are stored against black tire sidewalls. The presence of chemicals within tires, which are capable of migrating, is well known. New tire sidewalls are often coated by the manufacturer with water removable protective paints or coatings, when the tire sidewalls include a non-black component (e.g., a white sidewall) which can be detrimentally stained if the non-black component (whitewall) contacts the typical black colored remainder of another tire for an extended time during storage. The barrier effect of the transparent top layer maintains the fluorescent activity of the fluorescent dye for days, weeks, and desirably for months.

The fluorescent label desirably comprises a release liner, a pressure sensitive adhesive to bind said label to said tire, a nontransparent face sheet that reflects incident light back towards its source, and a transparent top layer containing one or more fluorescent dyes that are disproportionately located in the portion of the relatively transparent top layer nearest the adhesive side or nearest the outer surface.

The release liner is generally a disposable film or layer that allows the labels to be rolled onto themselves or stacked without sticking to themselves. It can be any conventional release backing such as wax paper, fluoropolymers, paper coated with fluoropolymers or a silicone release material, polypropylene, polyethylene etc. The release liner is removed before the label is adhered to the tire and thus ceases to be part of the label during the actual use of the label.

The adhesive can be any adhesive used on labels. Preferred are pressure sensitive adhesives, e.g. a hot melt adhesive such as Nicolmelt 82199 from Swift adhesives a division of Reichhold Chemicals Inc. of North Carolina. The adhesive need not be, but may be, a barrier to the migration of chemicals from the tire into the fluorescent label.

The face sheet is not inherently necessary, as the transparent top layer with the fluorescent dye is self supporting and could function without a face sheet. An opaque or reflective face sheet is desirable as they can increase the fluorescence detected by reflecting more of the incident exciting radiation back through the fluorescent dye when applied on black sidewall of a tire thus increasing the amount of fluorescence generated. The face sheet can also reflect generated fluorescence to the exterior (fluorescence detector). Reflective face sheets need not be separately made and can be applied directly to the transparent top layer as in metallizing. If a face sheet is used it is desirably a barrier to the migration of staining components from the tire through the adhesive into the transparent top layer. Barrier materials are metals, polyesters, cellophane, fluorinated polymers, poly(vinyl acetate), poly(vinyl alcohol), poly (vinyl pyrrolidone) or its copolymer with vinyl acetate, etc. Face sheets, which have little barrier properties, are plasticized poly(vinyl chloride), cloth, polyethylene, polypropylene, etc. For the purpose of this application opaque or nontransparent face sheets will be identified as those films through which it is difficult to read under recommended office lighting conditions normal text printed in 12 point type materials which is placed under the film.

The relatively transparent top layer can be any polymeric material that has barrier properties to the components in a black tire sidewall that deactivate the fluorescent dyes and pigments. It is defined as relatively transparent because the incident exciting UV light is desirably transmitted through the top layer to the fluorescent dye therein where it can result in the emission of visible light that is detected by the fluorescence detector. For the purpose of this application transparent will be defined as a top layer through which one can readily read 12 point text printed of a document placed below the film under normal recommended office lighting conditions. For the purpose of this application the transparency of the top layer will be determined without any face sheets or metallized layers which are intended to be non-transparent. The polymer used to form the top layer is desirably a polyester, cellophane, poly(vinyl acetate) or polymer of similar polarity. A preferred polyester is poly (ethylene terephthalate).

The transparent top layer is desirably fairly flexible so it can deform to match the curvature of the tire and thereby not strain the adhesive trying to hold it onto the tire. To maximize the flexibility the top layer is desirably fairly thin. As described below the fluorescent dye only needs to be present in about 1 to about 25 microns of the thickness of the top layer. Desirably the top layer is from about 5 to about 100 or 250 microns thick, more desirably from about 10 to about 50 microns thick, and preferably from about 12.5 to about 25 microns thick. The labels are desirably a little thicker than the top layer due to the inclusion of the adhesive and a face sheet. Desirably the label is less that 250 microns thick, more desirably less than 100 microns thick and preferably less than 75 microns thick. The labels do not need to be large to be detected. Desirably sizes for the label have widths of from about 0.2 or 0.5 inch to about 1 inch and length from about 0.5 inch to about 4 inch. Preferred shapes for the label are circles, ovals, etc. that are generally free of sharp (e.g. 90°) angles as these minimize interfacial residual stress thus alleviating premature corner lifting and later peeling of the labels from a tire.

Desirably the fluorescent labels are free of additional transparent films exterior to the fluorescent transparent top layer. The reason for excluding additional transparent films is that they add extra weight, cost and stiffness to the label. If an appropriate fluorescent transparent top layer is used the barrier properties can be achieved without over-lamination. Extra stiffness in the over-laminated labels may reduce its conformability thus increasing its propensity to partially peel off the tire and possibly become detached from the tire.

The fluorescent dye is desirably present in the transparent top layer in an amount sufficient to result in a reading from about 30 to about 100 Sick units or more at 3 inches as read by a florescence detector such as a LUT 1-4 Luminescence Scanner as described hereafter and more desirably from about 40 or 50 to about 100 or more. Fluorescence is defined as a material that can instantly emit light of higher wavelength than the incident light. This is different than reflecting light where incident and reflected lights have identical wavelengths. Typically many fluorescent materials absorb ultraviolet light (a high frequency, high energy light) and re-emit visible light (lower in frequency). Fluorescence is differentiated from phosphorescence in that the higher wavelength light is re-emitted in a shorter time, (e.g., about 10–8 second or less after excitation) after the sample is excited. In phosphorescence the energy is re-emitted after a longer period of delayed time after the excitation. Minerals often exhibit fluorescence. Electron bombardment can also serve as an energy source to induce fluorescent emissions of light. This technology is used in television screens.

The fluorescent pigment or dye can include Rhodamine, which is an organic dye that exhibits fluorescent emissions. Fluorescence can also be obtained from fluorescent mineral material such as fluorite. Other minerals that display fluorescence are autunite, calcite, hyalite, scapolite, scheelite and willemite. The amount of fluorescence and color of fluorescence are highly dependent upon the presence of certain chemical elements. Thus, slight variations in composition can change the amount of fluorescence or the perceived color of fluorescence of a fluorescent pigment or dye.

The fluorescent materials are available as powders and/or as dispersions in water or organics. They are commercially available from sources such as Day-Glo Color Corp. in Cleveland, Ohio. The preferred fluorescent materials are commercial fluorescent dyestuff having substantivity for polyester such as dispersed fluorescent dyes, optionally including water or solvent and often including minor amounts of a dispersant and a binder. These types of products are designed to be formulated with polymer solutions or dispersions if binders are necessary.

Desirably the fluorescent dye is disproportionately present in the transparent top layer such that at least 50, 75 or 85 weight percent of the dye is present in the first 20% of the thickness from the top or bottom surface of the transparent top layer and more preferably closest to the adhesive side. Further or alternatively desirably at least 70 weight percent of the fluorescent dye is present in the first 5 microns from the surface of the transparent top layer and preferably closest to the adhesive side.

One way to achieve disproportionate distribution of the dye in the transparent top layer is by dyeing processes wherein the dye is not uniformly distributed in the film. While any dyeing method (using heat, solvents, etc) may be used that provides an exterior barrier to migrating compounds that inactivate the fluorescent dyes, preferred dyeing methods are given in EP 0 587 282 A1 and WO 95/19266 hereby incorporated by reference. These disclosures describe an aqueous based dye solutions with polymeric thickeners that are applied to one or more surfaces of a substrate and heated. The dye solutions may include water miscible organic molecules like alcohols, glycols, ketones, esters etc. The dyes are transferred into the top layer by thermal diffusion. The dye solution desirably has very low viscosity such as less than 500 centipoise, more desirably less than 200 and preferably less than 100 centipoise. It is applied as a solution having a concentration from about 0.1 or 0.5 to about 2 weight percent dye. The polymeric thickeners are desirably from about 0.1, 0.2, or 0.5 to about 10 weight percent of the dye mixture. The polymeric thickeners are desirably from about 5 to about 50 weight percent, more desirably from about 5 to about 40 and preferably from about 10 to about 25 weight percent of the dried dye solution. The weight percent of the dye in the dried dye solution is desirably 10, 15, or 20 weight percent or less.

In the preferred dyeing process the water soluble polymers are desirably sodium carboxymethylcellulose, poly (vinyl alcohol), sodium alignate, water soluble cellulose ethers, etc. Desirably these polymers have low molecular weight such that the viscosity of a 1 weight percent solution at 25° C. is from about 2 to 100 centipoise, more desirably from about 5 to about 50. These viscosities are low shear viscosities as measured by an Oswald viscometer, Brookfield, or Zahn cup.

The preferred dyeing process uses dye particles of small sizes such that there are substantially not any particles in excess of 40, 20, 10 or 1 micron in diameter. The dye solution is preferably applied by gravure printing or roll coating. The wet layer is applied at a thickness from about 1 to about 10 microns. The heating step can be from about 80 to about 120, 160, 180, or 200° C. depending on the substrates ability to withstand higher temperatures. The heating time may vary from a few seconds to several minutes or more.

The fluorescent top layer may include fluorescent brighteners (optical brightening agents) such as Uvitex™. It is available from Ciba-Geigy Corp., in Ardsley, N.Y. Uvitex™ OB is in the chemical family of bis(benzoxazolyl) derivatives. Some brighteners such as Tinopal™ SFP from Ciba-Geigy Corp. (a stilbene-2,2'-disulphonic acid class brightener) can be the fluorescent pigment or dye. Other fluorescent brighteners are described in the Kirk-Othmer *Encyclopedia of Chemical Technology,* Vol. 4, 3rd Edition, published by John Wiley & Sons copyright 1978, pp. 213–226.

Fillers including talc, mica, silica, $TiO_2$, etc. can be used in the transparent top layer as long as they do not reduce the amount of fluorescence below the required amount needed for detection of the marking, e.g. currently 30 Sick units from 3 inches away. The fillers may also be used in the adhesive or the nontransparent face sheet. In the nontransparent face sheet the fillers can help in increasing the reflectance of incident light. Fillers like talc and mica may prevent migration of staining compounds from the tire from entering and discoloring or deactivating the fluorescence of the fluorescent top layer. Fillers can be used in an amount from about 1 to about 200 parts by weight per 100 parts by weight of the transparent top layer, adhesive, and/or nontransparent face sheet. In some embodiments it will be desired to have less fillers as they may absorb some of the source radiation, or the fluorescent emission from the coating, decreasing the amount of fluorescent light emitted by the top layer or label.

The antidegradants are added to maintain the integrity of the various components of the label during aging. Certain antidegradants are UV light absorbers and may be undesirable in this composition due to their effect of decreasing fluorescence.

Desirably the fluorescent label retains enough fluorescent e.g. about 20, 30, 40 or 50 Sick units or more at 3" (7.6 cm) or more to be read by a fluorescence detector (e.g. one using a light source and a receiver such as the LUT 1-4 Luminescence Scanner) after 2, 4 or 8 months aging in contact with a black tire sidewall at 25±5° C., and more desirably it retains enough fluorescence for 12 or 16 months or more under the same conditions. An accelerated aging test is available where the labels are aged when sandwiched between two cured black tire sidewall for 24, 48 or 72 hours at 160 or 180° F. During this test the labels are pressed against the sidewall by a one pound weight applied over a 1×2 inch area. It is anticipated that 72 hours of this accelerated aging is equivalent to at least one year of aging at room temperature. The different fluorescent dyes behave differently under this test. For example, the yellow dyes retain more fluorescence than magenta dye. Thus, a magenta label without polyester over-lamination loses more fluorescence than yellow label on vinyl face sheet in a 76 hour accelerated aging in contact with a black sidewall (see Table 1).

The fluorescent label is applied to a tire. A tire generally comprises a casing, two sidewalls, and a tread region. A major component of the tire is a carbon black filled vulcanized rubber composition typically including an oil extender, antioxidants, and antiozonants. The antioxidants and antiozonants are often staining compounds such as amines, e.g., aromatic amines and phenolic compounds. These antioxidants and antiozonants are known to migrate within the tire and from the tire. They can stain materials, which they come in contact with for long periods of time, and they seem to have an effect of reducing the fluorescence of fluorescent dyes and pigments in labels.

If the tire has a white sidewall then it may have a protective coating or paint, e.g. a poly(vinyl alcohol) coating on the whitewall, to prevent staining materials from staining the whitewall during storage in a tire warehouse. The fluorescent label or marking can be applied directly over these types of coatings or paints.

Pneumatic tires are typically manufactured from a wide variety of components. The particular components and the raw materials for the components are selected based upon the type of tire, e.g. aircraft tire, truck tire, passenger tire, etc. The materials used include high modulus fibers, wires, etc. precisely arranged within the rubber matrix. The rubber matrix is initially uncured so that it is deformable and shapeable during the preparation of the components and the assembly of the tire. Subsequent to final assembly of the tire the rubber matrix is crosslinked as a final step in the tire manufacturing process.

Crosslinking of the tires is generally accomplished with a tire curing press. The tire curing press for an automobile tire generally comprises a multi-section mold for the exterior of the tire and an inflatable bladder that presses the green uncured tire into the metal mold for the exterior of the tire. Often both the metal mold and the inflatable bladder are heated with a fluid such as steam to speed the tire curing process.

After curing the tire it is evaluated in various equipment such as a force machine. Such equipment to measure these variations is available from Akron Standard Corporation, Logan Machine Co. and Akron Specialty Machinery Inc. all of Akron, Ohio. The use of the force machine and other equipment is to assure that the tire has the correct size, shape, weight, uniformity, etc. Besides being a final quality check these measurements can be used to adjust or modify the tire building machine (tire assembly machine), tire curing (machine) press, and the size, shape and composition of the components to the tire to minimize variations in subsequently produced tires.

The force machine and related equipment can detect variations between sectors of the tire that are too small to substantially effect performance and which are acceptable to the final consumer. Similar variations occur in other portions of a wheel assembly such as the rim, hubcap, bearings, brake rotor, etc. If all of the wheel components are randomly assembled, then some of the wheels will be assembled with the variations in the components aggregating to make the wheel more out of round, out of balance, etc. than any of the individual wheel components. Realizing this, wheel assemblers are interested in having the wheel component manufacturers identify detectable variations so that some wheel components, such as the tire and the rim, can be selectively rotated with respect to each other. By doing this the aggregate variation of the assembly of two or more components is less than the largest variation in a single component. This is called mixing and matching the variations or match mounting in the case of a tire and a rim. These mixing and matching procedures make for a more uniform wheel assembly thus giving smoother ride.

The match mounting equipment is available from companies such as Dominion Tool and Die Co. of Michigan which utilizes a Lut 1-4 Luminescence Scanner to locate and align the fluorescence markings on both tire and rim as part of the assembly process from the tire and rim.

The fluorescent label has utility to mark rubber articles (e.g. tires) that inherently contain additives that detract from the fluorescent properties after aging. The tires marked with the fluorescent marking have utility as a component of a wheel assembly that can be compensatingly assembled to minimize the total variation between sectors of the wheel assembly.

The advantages of this invention are more particularly shown by the following example in which the parts and percentages are by weight unless otherwise indicated.

EXAMPLES

Materials:

Three face sheets with fluorescent top layers of the present invention were obtained from Courtaulds Performance Films owned by Courtaulds PLC (UK) and were produced by their proprietary deep-dyeing process (already cited EP and WO patents). Recently the film division of Courtaulds was bought by Akzo and renamed as C P Films.

1. 200 Gauge, K-51 Fluorescent Yellow Metallized,
2. 200 Gauge, K-50 Fluorescent Orange Metallized
3. 200 Gauge, K-52 Fluorescent Pink Metallized Magenta and Yellow radial first harmonic (R1H) labels on plasticized poly(vinyl chloride) and on metallized polyester were obtained from Bollin Label Systems. Yellow labels on non-staining plasticized poly(vinyl chloride) were obtained from MPI who obtained their face stock from Adhesives Research Inc. Magenta labels on non-staining poly(vinyl chloride) were also obtained from MPI. Several of the commercial labels were over-laminated with polypropylene or polyester for test purposes. It was anticipated that over-lamination with polyester would provide a barrier to migrating species from the exterior of the label, and would increase the retention of fluorescence. It is believed that the commercial labels are prepared by coating a fluorescent ink and binder onto various face sheets.

Fluorescent labels (including either 1) a fluorescent coating, a backing material (face sheet) and an adhesive or 2) an adhesive, backing (face sheet) and dyed fluorescent transparent film) were applied onto cured 6"×6"×0.025" (15.2×15.2×0.064 cm) staining tire sidewall compound. A protective Mylar film was peeled off the cured sidewall compound just before application of harmonic labels. A second cured staining sidewall compound (1"×2"×0.025") was placed on top of each label followed by a one pound metal weight. The samples were then aged in an oven at 160° F. for 72 hours. Two significant causes for loss of fluorescence are "through staining" (migrating species from the marked tire which migrate through the adhesive and face sheet before deactivating the fluorescent compound) and "contact staining" (migrating species from a tire compound contacting the label exterior causing deactivation of the fluorescent compound).

The fluorescence is easily measured with a fluorescence detector such as the LUT 1-4 luminescence scanner from SICK Optic-Electronic, Inc., Eden Prairie, Minn. The LUT 1-4 emits modulated ultraviolet light (UV-A) at a wavelength of 365 nm. It responds to light (detects light) of the same modulated frequency at 450 to 750 nm (visible light). According to the manufacturer the equipment is designed to detect luminescent substances which, when excited by UV-light, emit longer wavelength light and have a decay time of approximately 10 µs. Fluorescent marks are detectable with this LUT equipment on almost any surface, including wood, rusted metal, and reflective foil.

The LUT 1-4 contains both a sender and a receiver. Its source is a high-pressure, modulated light. By using optical filters, only UV-light at 365 nm is transmitted through the lens to the scanned material. The receiver responds only to the light of the same modulated frequency (a wavelength of approximately 450 to 750 nm). Thus, the receiver is relatively insensitive to ambient light.

TABLE 1

Results of Accelerated Aging when Test Pieces Were Sandwiched Between Staining Black Tire Sidewalls

| | | Details of Harmonic Label | | | Fluorescence in Sick Units | |
|---|---|---|---|---|---|---|
| Sample | Color | Face Sheet | Supplier | Over-lamination | Fresh | Aged |
| 1 | Magenta | Polyester | Bollin | None | 100+ | 0 |
| 2 | Magenta | Polyester | Bollin/mod* | Polyester | 100+ | 100+ |
| 3 | Magenta | Polyester | Bollin/mod* | Polypropylene | 100+ | 4 |
| 4** | Yellow | Vinyl | Bollin | None | 100+ | 0 |
| 5 | Yellow | Vinyl | Bollin/mod* | Polyester | 100 | 3 |
| 6 | Yellow | Vinyl | MPI/Adh Res | None | 100+ | 50–90 |
| 7 | Magenta | Vinyl | MPI/Adh Res | None | 100+ | 6 |
| | | | Present Invention | | | |
| 8 | Yellow | Polyester | Courtaulds | None | 32 | 32 |
| 9 | Orange | Polyester | Courtaulds | None | 41 | 40 |
| 10 | Pink | Polyester | Courtaulds | None | 39 | 39 |

MOD*= Bollin & Sons' label modified by Goodyear with a polyester or polypropylene over-lamination
**= commercially used on tires with non-staining sidewall Table 1 illustrates that many of the current commercial labels (samples 1,4,and 7) using fluorescent dyes or pigments do not withstand accelerated aging due to contact and/or through staining unless over-laminated (over-coated) with a barrier material such as polyester (sample 2). Sample 5 is believed to have lost fluorescence due to through staining (through the adhesive and vinyl backing) rather than contact staining which was prevented by the polyester over-lamination. Sample 3 illustrated that a polypropylene over-lamination film had inconsequential effect on contact staining. The slightly superior performance of sample 6 over sample 4 has no apparent explanation. It is anticipated that proprietary barrier coating of the manufacturer prevented through staining from deactivating the fluorescence in this sample. The fluorescence loss in sample 6 is only due to contact staining. However, an identical face sheet in sample 7 failed to retain any significant fluorescence due to a rapid fluorescence loss of the magenta color when compared to a yellow color. Other experiments imply that other suitable barrier materials would be cellophane or poly(vinyl acetate).

The present invention (samples 8, 9, and 10), which includes an inherent barrier between the dye and the black tire sidewalls, did not lose any significant fluorescence due to through and/or contact staining during accelerated aging It is anticipated that thicker top layers of the inventive top layers and/or top layers with more dye or fluorescent brightener would increase the initial and aged fluorescent values. It is also anticipated that other polar polymeric materials such as cellophane and poly(vinyl acetate) would make acceptable transparent top layers similar to polyester.

A comparison of samples 1 and 2 implies that sample 1 failed due to contact staining (i.e. through staining was prevented as a polyester face sheet was used) since the addition of a polyester film over-laminate eliminated loss of fluorescence. A comparison of samples 2 and 5 implies that the vinyl face sheet of sample 5 is ineffective to prevent through staining since the polyester over-lamination did not dramatically decrease the fluorescence loss.

In another experiment a sample equivalent to sample 7 was over-laminated with a polyester film at Goodyear and that sample retained 100% of its fluorescence after aging, thereby, indicating that original sample 7 failed due to contact staining. Comparison of samples 6 and original 7 indicates that the magenta color is far more vulnerable to lose fluorescence on contact than the yellow color.

While in accordance with the patent statutes the best mode and preferred embodiment has been set forth, the scope of the invention is not limited thereto, but rather by the scope of the attached claims.

What is claimed is:

1. A tire variation identification fluorescent label for identifying the location of one or more variations in a tire, said label comprising;
   a) a release liner
   b) a pressure sensitive adhesive layer to bind said label to said tire, said pressure sensitive adhesive layer removably attached to one side of said release liner
   c) a nontransparent face sheet that reflects at least 10 percent of incident light, said sheet attached to said pressure sensitive adhesive layer on the side opposite said release liner; and
   d) a transparent top layer located on said face sheet, said top layer comprising a polymer and one or more fluorescent dyes, said top layer a) being a single film, b) being free of additional protective transparent films as over-lamination on the side farthest from said face sheet, and c) having at least 50 wt. % of said fluorescent dye located either within the 20% of the thickness closest to the adhesive side or the exterior side, and said label being resistant to staining by rubber articles.

2. A label according to claim 1, wherein at least 85 weight percent of said fluorescent dye is in the 20% of the thickness of said top layer closest to the adhesive side.

3. A label according to claim 1, wherein at least 70 weight percent of said fluorescent dye is in the first 5 microns of said top layer closest to the adhesive side.

4. A label according to claim 1, wherein said nontransparent face sheet is a metal coating or a white face sheet.

5. A label according to claim 1, wherein said top layer comprises polyester, poly(vinyl acetate) or cellophane.

6. A label according to claim 5, wherein said top layer has a thickness from about 5 microns to about 100 microns.

7. A tire variation identification fluorescent label resistant to staining comprising:
   a transparent layer having a thickness of from about 5 to about 250 microns;
   a nontransparent face sheet attached to one side of said transparent layer;
   a pressure sensitive adhesive layer attached to said face sheet on the side opposite said transparent layer; and a release liner releasably attached to said pressure sensitive adhesive layer, said transparent layer comprising a polymer and at least one fluorescent material, said transparent layer being free of overlamination, and said label adapted to identify a location of a variation in a tire.

8. A label according to claim 7, wherein at least 50 weight percent of said fluorescent material is located within the 20% of the thickness of said transparent layer closest to either the adhesive layer or exterior side, and wherein said fluorescent material is fluorescent dye.

9. A label according to claim 8, wherein at least 70 weight percent of said fluorescent dye is located within the first 5 microns of said transparent layer closest to the adhesive layer, and wherein said fluorescent dye is transferred into said transparent layer by thermal diffusion.

10. A label according to claim 8, wherein said nontransparent face sheet is a metal, a polyester, cellophane, a fluorinated polymer, poly(vinyl acetate), poly(vinyl alcohol), poly (vinyl pyrrolidone), or combinations thereof.

11. A label according to claim 8, wherein said polymer of said transparent layer comprises polyester, poly (vinyl acetate) or cellophane.

12. A label according to claim 10 wherein said nontransparent face sheet is metal, and wherein said polymer of said transparent layer is polyester.

\* \* \* \* \*